United States Patent
Krammer

(10) Patent No.: US 11,873,868 B2
(45) Date of Patent: Jan. 16, 2024

(54) VALVE CONTROL SYSTEM FOR VISCOUS FRICTION CLUTCH

(71) Applicant: Horton, Inc., Roseville, MN (US)

(72) Inventor: Raimund Krammer, Gerolzhofen (DE)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 17/996,726

(22) PCT Filed: Apr. 20, 2021

(86) PCT No.: PCT/US2021/070423
§ 371 (c)(1),
(2) Date: Oct. 20, 2022

(87) PCT Pub. No.: WO2021/232034
PCT Pub. Date: Nov. 18, 2021

(65) Prior Publication Data
US 2023/0213072 A1    Jul. 6, 2023

Related U.S. Application Data

(60) Provisional application No. 63/024,592, filed on May 14, 2020.

(51) Int. Cl.
F16D 35/02    (2006.01)
(52) U.S. Cl.
CPC .................................. *F16D 35/024* (2013.01)
(58) Field of Classification Search
CPC .................. F16D 35/024; F16D 35/00–029
USPC .............................................. 192/58.5–58.61
See application file for complete search history.

(56) References Cited

U.S. PATENT DOCUMENTS

| 3,215,235 A | 11/1965 | Kamm |
| 3,444,748 A | 5/1969 | Sutaruk |
| 3,498,431 A | 3/1970 | Sutaruk |
| 3,757,914 A | 9/1973 | Elmer |

(Continued)

FOREIGN PATENT DOCUMENTS

| CN | 205207220 U | 5/2016 |
| DE | 3148872 A1 | 6/1983 |

(Continued)

OTHER PUBLICATIONS

Applicant-annotated collection of Cojali S.L. prior art product drawings and photographs from 2012, 2017/2018, and unknown date(s) (2 pages).

(Continued)

*Primary Examiner* — David R Morris
(74) *Attorney, Agent, or Firm* — Westman, Champlin & Kochler, P.A.

(57) ABSTRACT

A viscous friction clutch includes a rotor, a housing that is rotatable relative to the rotor, a working chamber located between the rotor and the housing such that a volume of shear fluid can be selectively introduced to the working chamber to contact both the rotor and the housing, an electromagnetic coil, a valve assembly that controls the volume of the shear fluid present in the working chamber, and a flux path that magnetically links the electromagnetic coil and the valve assembly. The flux path passes through a flux guide part made of a ferromagnetic material that extends through the rotor in an interior of the viscous friction clutch and across a flux gap that traverses both an air gap and a non-ferromagnetic portion of the housing.

29 Claims, 8 Drawing Sheets

(56) References Cited

U.S. PATENT DOCUMENTS

| | | |
|---|---|---|
| 4,046,239 A | 9/1977 | Tinholt |
| 4,346,797 A | 8/1982 | Bopp |
| 4,526,257 A | 7/1985 | Mueller |
| 4,556,138 A | 12/1985 | Martin et al. |
| 4,987,986 A | 1/1991 | Kennedy et al. |
| 5,030,865 A | 7/1991 | Rockey et al. |
| 5,320,206 A | 6/1994 | Maejima |
| 5,511,643 A | 4/1996 | Brown |
| 5,992,594 A | 11/1999 | Herrle et al. |
| 5,996,911 A | 12/1999 | Gesk et al. |
| 6,419,064 B1 | 7/2002 | Krammer |
| 6,443,283 B1 | 9/2002 | Augenstein et al. |
| 6,481,390 B1 | 11/2002 | Robb |
| 6,695,113 B2 | 2/2004 | Lutz |
| 6,935,478 B2 | 8/2005 | Dräger et al. |
| 7,083,032 B2 | 8/2006 | Boyer |
| 7,191,883 B2 | 3/2007 | Angermaier |
| 7,278,524 B2 | 10/2007 | Boyer |
| 7,588,132 B2 | 9/2009 | Shiozaki et al. |
| 7,854,307 B2 | 12/2010 | Hennessy et al. |
| 7,886,886 B2 | 2/2011 | Schultheiss et al. |
| 7,913,825 B2 | 3/2011 | Boyer |
| 7,913,826 B2 | 3/2011 | Boyer |
| 7,938,240 B2 | 5/2011 | Hennessy et al. |
| 7,946,400 B2 | 5/2011 | Hennessy et al. |
| 7,980,373 B2 | 7/2011 | Boyer |
| 8,100,241 B2 | 1/2012 | Hennessy et al. |
| 8,186,494 B2 | 5/2012 | Boyer |
| 8,596,438 B2 | 12/2013 | Boyer |
| 8,616,357 B2 | 12/2013 | Boyer |
| 8,881,881 B2 | 11/2014 | Gevers et al. |
| 8,887,888 B2 | 11/2014 | Hennessy et al. |
| 9,239,086 B2 | 1/2016 | Kubota et al. |
| 2002/0096132 A1 | 7/2002 | Stretch et al. |
| 2006/0243554 A1 | 11/2006 | May |
| 2007/0205071 A1 | 9/2007 | Light |
| 2008/0257677 A1 | 10/2008 | Schultheiss et al. |
| 2013/0284556 A1 | 10/2013 | Gevers et al. |
| 2014/0216881 A1 | 8/2014 | Tilly |
| 2015/0219168 A1 | 8/2015 | Kubota et al. |
| 2015/0300424 A1 | 10/2015 | Ueda et al. |
| 2016/0003311 A1 | 1/2016 | Krammer et al. |
| 2016/0169235 A1 | 6/2016 | Ignatovich |
| 2017/0207015 A1 | 7/2017 | Premaratne et al. |
| 2019/0107158 A1 | 4/2019 | Hennessy et al. |
| 2019/0178310 A1 | 6/2019 | Hennessy et al. |

FOREIGN PATENT DOCUMENTS

| | | |
|---|---|---|
| DE | 4011528 A1 | 10/1991 |
| DE | 102011076745 A1 | 12/2012 |
| EP | 0350585 B1 | 4/1993 |
| EP | 0407750 B1 | 8/1993 |
| EP | 2811133 A1 | 12/2014 |
| EP | 2902651 A2 | 8/2015 |
| JP | S59137628 A | 8/1984 |
| JP | 2000314437 A | 11/2000 |
| JP | 5455690 B2 | 3/2014 |
| WO | 2004051107 A2 | 6/2004 |
| WO | 2007016497 A1 | 2/2007 |
| WO | 2009030574 A1 | 3/2009 |
| WO | 2011062856 A2 | 5/2011 |
| WO | 2014004335 A1 | 1/2014 |
| WO | 2014047430 A1 | 3/2014 |
| WO | 2014158397 A1 | 10/2014 |
| WO | 2014159374 A1 | 10/2014 |
| WO | 2017062328 A1 | 4/2017 |
| WO | 2018004833 A1 | 1/2018 |

OTHER PUBLICATIONS

Cojali, "Fan Clutch—Technical Sheet", ID Ref. 7063415, Aug. 20, 2020 (1 page).

Cojali, "Fan Clutch Wheel—Technical Sheet", ID Ref. 7075401, Jun. 3, 2020 (1 page).

Cojali, "Cooling Systems: Commercial Vehicles, Passenger & Light Vehicles, Agricultural Vehicles" 2018 V1, 2018 (166 pages).

Cojali, "Cooling Systems for Commercial Vehicles," https://web.archive.org/web/20180429024519/http://www.cojali.com/en/products/cooling-systems, retrieved Apr. 29, 2018 (6 pages).

Cojali, "Cooling Systems for Commercial Vehicles", https://www.cojali.com/en/products/cooling-systems, retrieved May 6, 2020 (2 pages).

Cojali, "7063401 | 51066300115 | Fan Clutch Electronic Regulation," https://www.cojali.com/en/reference/51066300115/fan-clutch-electronic-regulation, retrieved Mar. 12, 2021 (3 pages).

Cojali, "7063415 | 51066300107 | Fan Clutch Electronic Regulation," https://www.cojali.com/en/reference/51066300107/fan-clutch-electronic-regulation, retrieved Mar. 31, 2021 (3 pages).

Cojali, "7075401 | 1453967 | Fan Clutch Electronic Regulation Wheel," https://www.cojali.com/en/reference/1453967/fan-clutch-electronic-regulation-wheel, retrieved Mar. 31, 2021 (3 pages).

Cojali, "Fan Clutches", https://www.cojali.com/en/catalog/61/fan-clutches/?p=10&vehicle=1, retrieved Mar. 31, 2021 (16 pages).

International Search Report and Written Opinion in corresponding International Application No. PCT/US2021/070423 dated Aug. 6, 2021.

VALVE CONTROL SYSTEM FOR VISCOUS FRICTION CLUTCH

The present application is a Section 371 National Stage Application of International Application No. PCT/US2021/070423, filed Apr. 20, 2021 and published as WO 2021/232034 A1 on Nov. 18, 2021, in English, and further claims priority to U.S. provisional patent app. Ser. No. 63/024,592, filed May 14, 2020.

FIELD

The present invention relates generally to viscous friction clutches, and more particularly to electromagnetic control systems for viscous friction clutches, viscous friction clutches including such electromagnetic control systems, as well as methods of making and using the same.

BACKGROUND

Clutches (also called drives or couplings) are used in a variety of contexts to selectively control torque transmission between an input and an output. For instance, fan clutches are used to control rotation of a fan, such as a cooling fan for an automotive or industrial application. Controlled operation of a cooling fan provides all the benefits associated with cooling flows when the clutch is engaged, but also allows the fan to be turned off when not needed, thereby reducing parasitic losses and increasing fuel efficiency. Turning off a cooling fan can also allow additional power to be diverted to other uses. Some clutches can allow for a variable output speed to be selectively controlled across a range, rather than merely in a binary on/off manner. Fully variable clutch control can help to optimize performance, such as to tailor cooling to current conditions in cooling fan applications.

Viscous friction clutches (also simply called viscous clutches) are used in a wide variety of applications, such as for automotive fan drive applications. These clutches typically employ relatively thick silicone oil (more generally called shear fluid or viscous fluid) for the selective transmission of torque between two rotatable components. Engagement or disengagement of the clutch is made possible by selectively allowing the shear fluid into and out of a working area of the clutch located between input and output members (for example, between a rotor and a housing) where a viscous shear coupling can be created by the shear fluid to frictionally transmit torque from the input member to the output member. The volume of shear fluid present in the working chamber controls the speed difference between a primary/input side (input speed) and a secondary/output side (output speed) of the clutch. A valve assembly is used to control the flow of the shear fluid into and/or out of the working area.

Temperature-sensing bimetal-controlled clutches are known. But such bimetal valve controls do not permit active control and may not be suitable for some applications (for example, blower fan applications).

Electromagnetic valve controls are also known, which use an electromagnetic coil to selectively generate magnetic flux used to operate the valve assembly. In a typical viscous clutch, a valve element controlling shear fluid flow must be located wholly or partly within the clutch in order to regulate shear fluid flow into and/or out of the reservoir, while the electromagnetic coil is usually placed outside the clutch at an exterior of the clutch in order to allow suitable external electrical connections to be made. Such typical viscous clutches have a magnetic flux path and/or a mechanical connection between the electromagnetic coil and the valve in order to operate the valve element with an electromagnetic coil physically spaced from that valve element. However, many prior art viscous clutches have limitations associated with magnetic flux circuits and/or mechanical connections (for example, control rods) used for electromagnetic control of the valve assembly. For instance, some clutch designs allow the shear fluid to be stored in a reservoir carried on or otherwise rotationally fixed with an input rotor (located inside the housing and generally rotating whenever a torque input to the clutch is present) while the clutch is disengaged, in order to keep kinetic energy available in the shear fluid to allow rapid engagement of an outer output housing of the clutch from the disengaged/off condition, and to allow the clutch to have a very low output speed (for example, fan speed) while the valve is positioned to limit the volume of shear fluid in the working area. However, carrying the reservoir on the rotor disk or the like substantially limits design flexibility, particularly where the valve element rotates with the clutch input while the electromagnetic coil is rotationally fixed (that is, non-rotating). Positioning a valve relative to a rotating reservoir while still providing suitable fluid and flux paths presents formidable challenges, including the need to seal potential leak paths through which the shear fluid might escape. These constraints typically apply while designers also still seek to provide a relatively compact and low-mass clutch package that can accommodate desired torque loads and also function quickly, efficiently, and reliably.

U.S. Pat. No. 6,419,064 B1 (with German counterpart DE 19 940 099 B4) describes a mechanical connection between an external electromagnetic coil to a valve inside the clutch. Another mechanical connection for a valve assembly is disclosed in PCT International Pat. App. Pub. No. WO 2014/047430A1. But mechanical connections require additional parts for the sealing against the leakage of the shear fluid from the inside of the clutch to its outside and for the electromagnetic control of the mechanical connection(s) themselves.

U.S. Pat. No. 6,443,283 B1 describes an embedded insert in the housing of the clutch for a magnetic flux path that links a valve element armature and an electromagnetic coil. But embedded ferrous inserts in a die cast aluminum housing create a risk of leakage due to different coefficients of thermal expansion between the aluminum housing and the ferrous insert. This leakage problem is known in the art and is described, for instance, in U.S. Pat. No. 5,511,643.

Other viscous clutch designs that provide flux paths through an interior of the clutch include those disclosed in U.S. Pat. No. 5,992,594 (with German counterpart DE 197 53 725 C2), U.S. Pat. No. 7,886,886 B2 (published as U.S. Pat. App. Pub. No. 2008/0257677A1), and PCT International Pat. App. Pub. No. WO2011/062856A2, as well as those of commercially available cooling system clutches from Cojali S. L. (Ciudad Real, Spain). These clutch designs generally have a flux path that does not pass through a housing but instead the flux path is either entirely contained within an interior of the housing or else the flux path follows multiple isolated pathways in a shaft, rotor hub, and/or bearing assembly located radially inward from the housing (that is, the flux path does not cross any part of the housing as such but rather avoids the housing by passing back and forth at locations inward from the housing). In the case of the commercial clutches from Cojali, the flux path goes from an inner diameter of a coil through a center shaft to a valve and then any way back to an outer diameter of the coil, without any flux guides (that is, the magnetic flux returns to the coil from the valve in an unguided manner).

Additional considerations include the need to provide a relatively compact and relatively low-mass overall clutch package. The electromagnetic coil must generally be large enough to generate a sufficient magnetic field to actuate the valve assembly. A control system that requires relatively large amounts of magnetic flux to actuate the valve element requires a correspondingly large electromagnetic coil, but such large electromagnetic coils take up considerable space and also have relatively high mass. Control systems that can reliably operate with lower overall magnetic flux requirements, that is, control systems that can utilize magnetic flux relatively efficiently for valve actuation, can therefore help provide relatively compact and low-mass clutch packages.

Further, a clutch configured to have a "live" center shaft that serves as either the clutch input or output is desirable for some applications. A "live" center shaft generally refers to a shaft that is rotatable during clutch operation, as opposed to a static or rotationally stationary shaft such as a mounting shaft of a rotationally fixed journal bracket. "Live" center shaft clutches can be useful for light-duty applications, for instance. A clutch configured to have a "live" center shaft can further help provide a relatively compact overall clutch package with a relatively low mass, such as by potentially eliminating the need for a pulley (or sheave), journal bracket, and the like.

Thus, it is desired to provide an electromagnetic control system for a viscous friction clutch, and associated methods of making and using the same, that reduces or eliminates a need for a mechanical connection that passes through a clutch housing and/or a flux guide insert embedded in the housing, while concurrently providing a relatively compact and low-mass clutch package. It is further desired to provide such a clutch configured with a "live" center shaft.

SUMMARY

In one aspect, a viscous friction clutch includes a rotor, a housing that is rotatable relative to the rotor, a working chamber located between the rotor and the housing such that a volume of shear fluid can be selectively introduced to the working chamber to contact both the rotor and the housing, an electromagnetic coil, a valve assembly that controls the volume of the shear fluid present in the working chamber, and a flux path that magnetically links the electromagnetic coil and the valve assembly. The flux path passes through a flux guide part made of a ferromagnetic material that extends through the rotor in an interior of the viscous friction clutch and across a flux gap that traverses both an air gap and a non-ferromagnetic portion of the housing.

In another aspect, a method of transmitting magnetic flux through a viscous friction clutch to operate a valve assembly is addressed. The viscous friction clutch includes a rotor and a housing that are each rotatable and also a shaft that is rotationally fixed to the rotor. The valve assembly controls a volume of shear fluid present in a working chamber in order to selectively control a degree of viscous frictional engagement between the rotor and the housing. The method includes energizing a rotationally stationary electromagnetic coil located at an exterior of the housing of the viscous friction clutch, transmitting magnetic flux from the electromagnetic coil to a coil housing that at least partially surrounds the electromagnetic coil, transmitting magnetic flux from the coil housing to the shaft of the viscous friction clutch across a radial gap, transmitting magnetic flux from the shaft to an armature of the valve assembly across an axial gap in an area of magnetic attraction, transmitting magnetic flux from the armature to a flux guide part across a gap, transmitting magnetic flux along the flux guide part between axially opposite front and rear sides of the rotor of the viscous friction clutch, transmitting magnetic flux from the flux guide part to the coil housing across a flux gap that includes a non-ferromagnetic portion of the housing of the viscous friction clutch, and transmitting magnetic flux from the coil housing back to the electromagnetic coil. The flux guide part is made of a ferromagnetic material.

In still further aspects, a method of making a viscous friction clutch is also provided.

The present summary is provided only by way of example, and not limitation. Other aspects of the present invention will be appreciated in view of the entirety of the present disclosure, including the entire text, claims, and accompanying figures.

Figure 1:
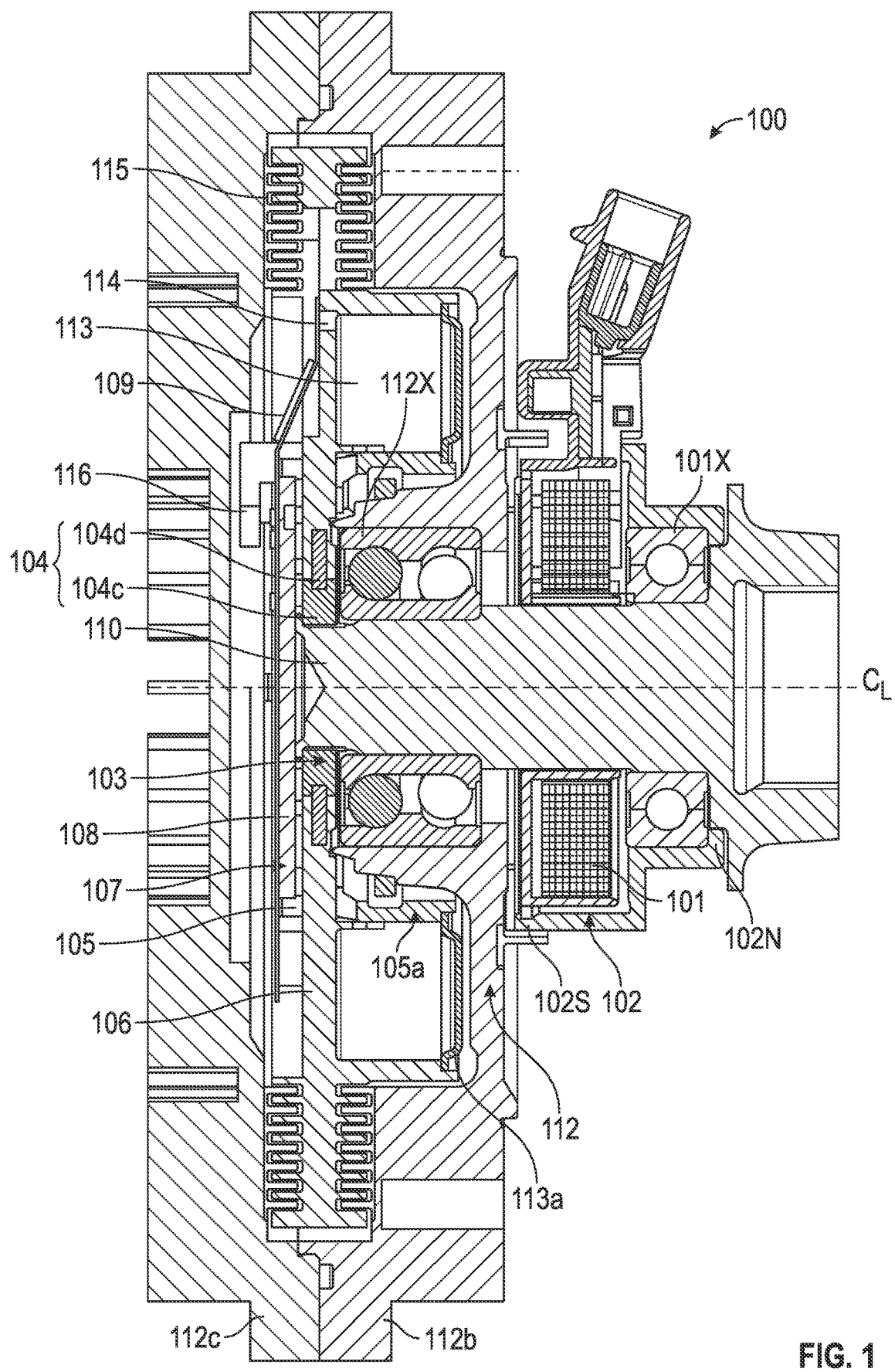
FIG. 1 is a cross-sectional view of an embodiment of a viscous friction clutch according to the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In general, embodiments of the present invention provide an electromagnetic control system for a viscous friction clutch that can be controlled to selectively transmit torque between a clutch input and a clutch output at a desired speed. Such a viscous friction clutch can be used to selectively drive a cooling fan in a vehicle or for speed controlling torque transmission to other devices, among other possible uses. The viscous friction clutch can include a center shaft, a rotor, a housing, a reservoir, a working chamber, and a valve assembly having an armature operated by magnetic flux from an electromagnetic coil. The electromagnetic coil can be located at an exterior of the viscous friction clutch, and can be rotationally fixed, that is, rotationally stationary. The armature and a valve element of the valve assembly can each be located within an interior of the viscous friction clutch, in some embodiments. In some embodiments, the valve assembly and the electromagnetic coil can be located at opposite sides of the rotor. The center shaft can be a "live" center shaft that is rotationally fixed to the rotor so as to co-rotate at the same speed as the rotor at all times, in some embodiments. The rotor can be configured like a disk in some embodiments. The reservoir can be carried with the input of the clutch, such as on the rotor, so as to rotate whenever there is a torque input to the clutch. The housing can be a multi-piece assembly that includes a base and a cover that at least partially surround the rotor, in some embodiments. The viscous friction can include a rotor insert assembly in the rotor that includes a magnetic flux guiding part. The rotor insert assembly fulfils multiple functions. A first part of the rotor insert assembly, at least partially made of a magnetic flux conductive material such as a ferromagnetic material, operates as a magnetic flux path controller or guide that directs magnetic flux along a portion of a flux path through the viscous friction clutch (for instance, across or through the rotor) to facilitate electromagnetically controlled operation of a valve located within the clutch, without the need for an additional embedded flux-conducting insert in a housing of the clutch. A second part of the rotor insert assembly, also called a hub of the insert assembly, provides a structural connection to transmit torque between a center shaft and the rotor while reducing or avoiding a magnetic short-circuit between the shaft and the first part of the rotor insert assembly (that is, the flux guide part of the rotor insert assembly). The flux path through the clutch can extend from the electromagnetic coil to the center shaft, then to the armature of the valve assembly, then to the first, flux guide part of the rotor insert assembly (which can transmit magnetic flux through the rotor that can be made of a non-ferromagnetic material), and then across a flux gap back to the electromagnetic coil. In an alternative embodiment, the rotor insert assembly includes a multi-piece hub part with a ferromagnetic hub core and a non-ferromagnetic disk part; the flux path through the clutch in such an alternative embodiment can extend from the electromagnetic coil to the center shaft, then to the hub core, then to the armature of the valve assembly, then to the first, flux guide part of the rotor insert assembly, and then across a flux gap back to the electromagnetic coil. In various embodiments, the flux gap can traverse a portion of the housing (such as a portion of the base of the housing) made of a non-ferromagnetic material, such as aluminum. In some embodiments, a housing cover access opening, a seal and seal carrier, an armature stop, and/or other optional components can further be provided. Thus, for example, disclosed embodiments provide a viscous friction clutch, for driving a cooling fan in a vehicle or for speed controlling torque transmission to other devices, with an electromagnetic flux path passing through an interior of the clutch, the flux path passing through both a ferromagnetic flux guide part that passes through a rotor inside the clutch and a flux gap that traverses a non-ferromagnetic portion of a housing that at least partially surrounds the rotor as well as air gaps on each side of the non-ferromagnetic portion of the housing; the flux guide part can be embedded in or connected to the rotor, which can be made of non-ferromagnetic material. Embodiments of methods of making and using a viscous friction clutch with an electromagnetic control system are also disclosed, or will be apparent to those of ordinary skill in the art.

Further embodiments are also contemplated. For instance, while disclosed embodiments show an electromagnetic control system used with live center clutch configurations, it will be understood that the electromagnetic control system, the rotor insert assembly, and/or associated methods can be utilized with other types of clutch configurations as well. Persons of ordinary skill in the art will recognize numerous features and benefits in view of the entirety of the present disclosure, including the accompanying drawings.

The present application is based on and claims the benefit of U.S. provisional patent application Ser. No. 63/024,592, filed May 14, 2020, the content of which is hereby incorporated by reference in its entirety.

Figure 2:
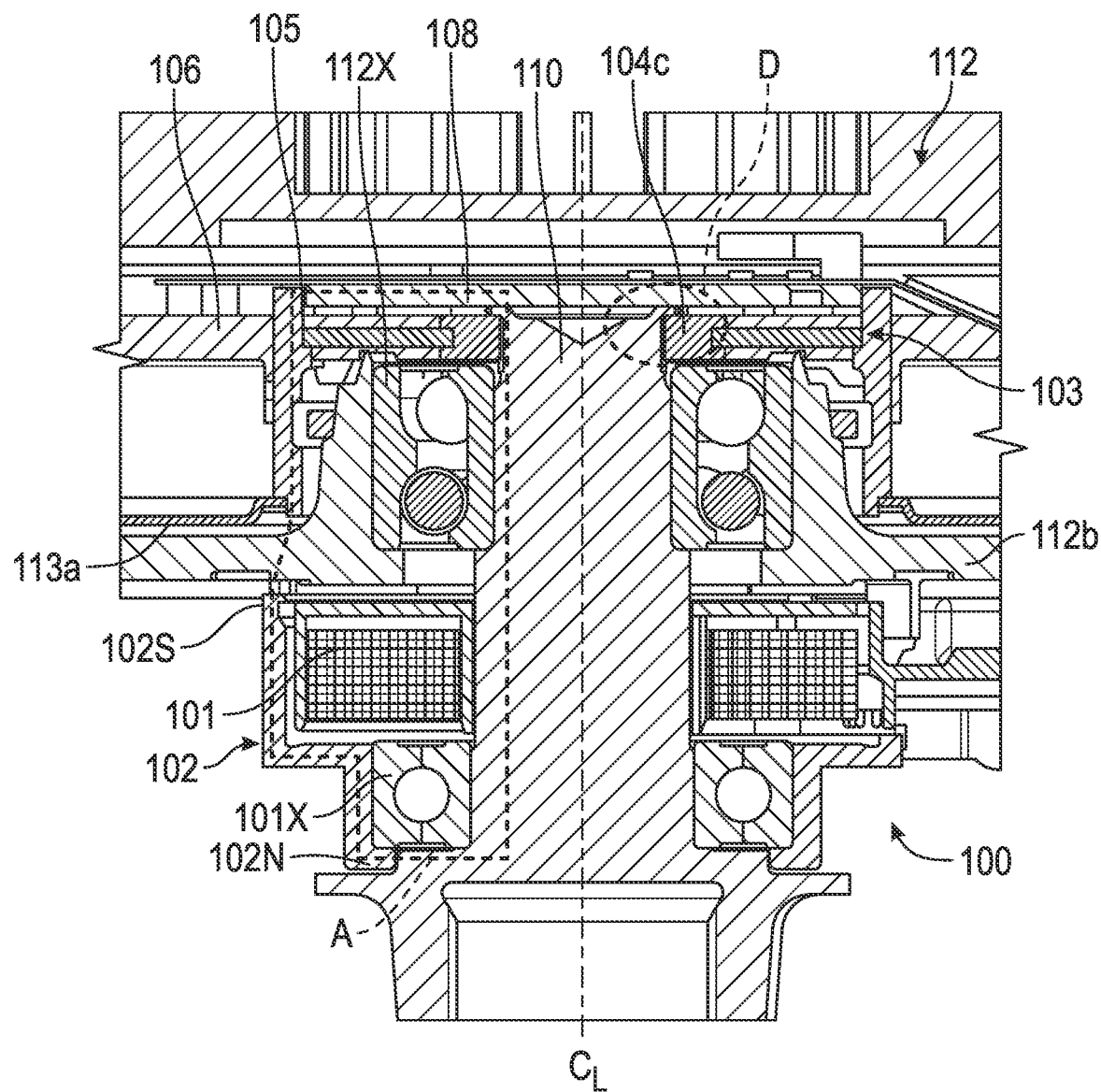
FIG. 2 is a partial cross-sectional view of the viscous friction clutch of FIG. 1 with schematic annotations to illustrate a magnetic flux path and area of magnetic attraction.
Figure 3:
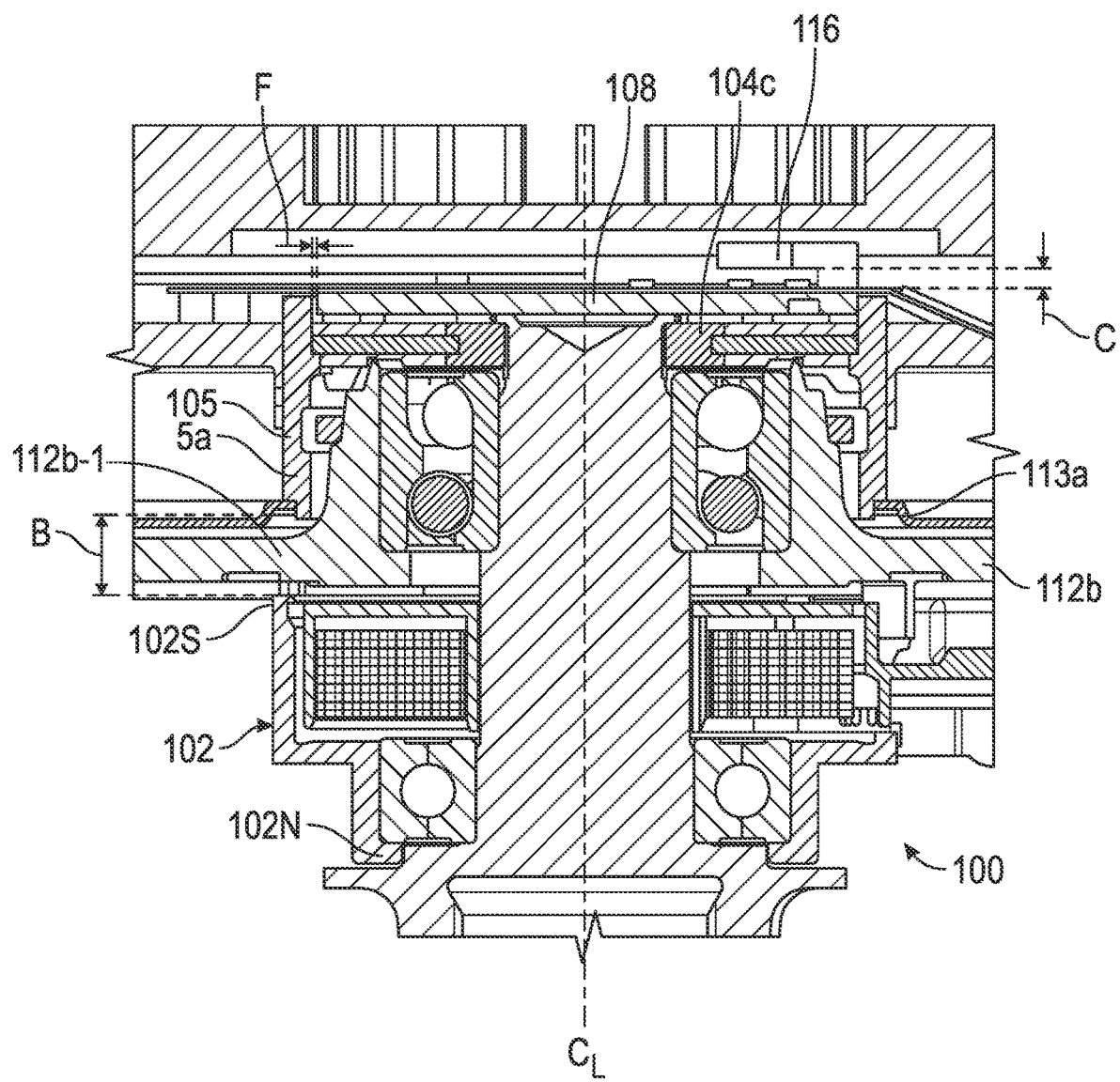
FIG. 3 is another partial cross-sectional view of a portion of the viscous friction clutch of FIGS. 1 and 2.
Figure 4:
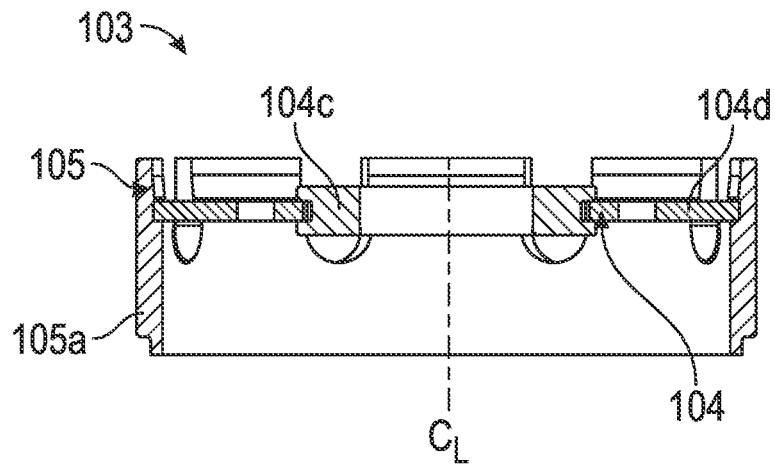
FIG. 4 is a cross-sectional view of a rotor insert assembly, shown in isolation.
Figure 5:
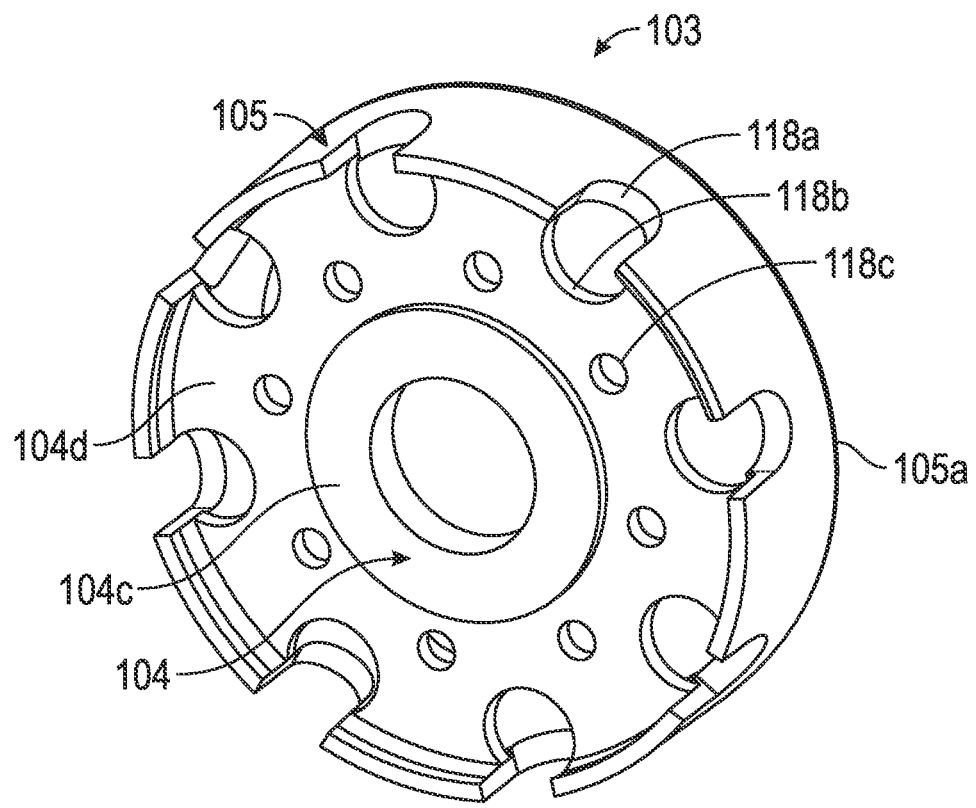
FIG. 5 is a front perspective view of the rotor insert assembly of FIG. 4.

FIGS. 1-5 illustrate one embodiment of a viscous friction clutch 100. FIG. 1 is a cross-sectional view of the viscous friction clutch 100; FIG. 2 is another cross-sectional view of the viscous friction clutch 100 with schematic annotations to illustrate a magnetic flux path A and area of magnetic attraction D; and FIG. 3 is a partial cross-sectional view of a portion of the viscous friction clutch 100. FIGS. 4 and 5 show an assembly that is part of the viscous friction clutch 100, in isolation.

The viscous friction clutch 100 as shown in the embodiment of FIG. 1 includes an electromagnetic coil 101, a coil housing 102 defining a north pole 102N and a south pole 102S, a rotor insert assembly 103 having a hub part 104 and a flux guide part 105, a rotor 106, a valve assembly 107 (shown in an attracted position) having an armature 108 and a valve element 109, a shaft 110, a housing 112, a reservoir 113, a release orifice 114, and a working chamber 115. Although not specifically shown, the viscous friction clutch 100 further includes a suitable return bore and pumping element, both of which are well known in the art of viscous friction clutches.

As shown in the illustrated embodiment, the shaft 110 is a "live" center shaft that defines an axis of rotation $C_L$ of the viscous friction clutch 100. The electromagnetic coil 101 can be rotationally stationary and can be rotationally mounted on the shaft 110 by suitable bearings 101X. Additionally, the coil housing 102 can be rotationally mounted on the shaft 110 with the bearings 101X that also support the electromagnetic coil 101, and can at least partially surround the electromagnetic coil 101. The electromagnetic coil 101 and the coil housing 102 can both be located at an exterior of the housing 112. The shaft 110 can have an attachment feature at a rear end. The shaft 110 can function as an input to the viscous friction clutch 100, in order to accept a torque input from a prime mover (not shown), such as an internal combustion engine of a vehicle. In the illustrated embodiment, the shaft 110 is made, at least partially, of a magnetic flux-conductive ferromagnetic material.

The electromagnetic coil 101 is positioned at least partially in the coil housing 102. In the illustrated embodiment, the north pole 102N of the coil housing 102 extends radially inward toward the shaft 110 and the south pole 102S of the coil housing 102 extends axially toward the flux guide part 105 (and the base 112b of the housing 112).

The rotor 106 can be rotationally fixed to the shaft 110, such that the rotor 106 and the shaft 110 co-rotate together at the same speed (for example, at the input speed of the torque input to the clutch 100). The rotor 106 is configured as a disk in the illustrated embodiment, and can be made of a non-ferromagnetic material such as aluminum. At least portions of the hub part 104 and the flux guide part 105 of the rotor insert assembly 103 are embedded in the rotor 106 as shown in the illustrated embodiment.

In the illustrated embodiment, the rotor insert assembly 103 includes the hub part 104 at a radially inner location and the flux guide part 105 at a radially outer location (the rotor insert assembly 103 is described further below with respect to FIGS. 4 and 5). The hub part 104 can be located at a radially inner part of the rotor 106 and can provide a structural attachment between the rotor 106 and the shaft 110. In the illustrated embodiment, the hub part 104 is a multi-piece assembly that includes a core 104c and a disk 104d, with the disk 104d extending radially outward from the core 104c. The core 104c can be positioned directly on the shaft 110. The hub part 104 can include a non-ferromagnetic material such as austenitic stainless steel, and/or can be configured with magnetic flux-interrupting features that reduce or eliminate a magnetic short-circuit in a generally radial direction between the flux guide part 105 and the shaft 110, as explained further below. In the illustrated embodiment, the core 104c is made of a ferromagnetic material and the disk 104d is made of a non-ferromagnetic material that interrupts any magnetic flux flow along the rotor insert assembly 103 in a radial direction. More generally, the hub part 104 of the rotor insert assembly 103 of the illustrated embodiment includes non-ferromagnetic or at least partially non-ferromagnetic portion between its inner diameter and its outer diameter.

The flux guide part 105 can be attached to hub part 104 at a radially outer portion of the disk 104d. The flux guide part 105 extends axially through the rotor 106. The flux guide part 105 can be made of a ferromagnetic material in order to conduct magnetic flux through non-ferromagnetic material of the rotor 106. The flux guide part 105 in the illustrated embodiment includes a rear end 105a extending and protruding from a rear side of the rotor 106 in the axial direction, which helps guide magnetic flux to the south pole 102S of the coil housing 102, such as at or adjacent to an outer diameter of the coil housing 102, as explained further below. As shown in the illustrated embodiment, the rear end 105a of the flux guide part 105 is located at a radial position that overlaps with a radial position of the south pole 102S of the coil housing 102 (such that a flux path between them can be substantially axial or entirely axial), though in further embodiments other relative radial positions are possible, such as with the rear end 105a located radially inward from the south pole 102S of the coil housing 102.

The reservoir 113 has an internal volume for storing a supply of a shear fluid. The release orifice 114 allows the shear fluid to flow from the reservoir 113 to the working chamber 115 and can be selectively covered and uncovered by the valve assembly 107. A return bore (not shown) exits to the reservoir 113 so that the shear fluid can be returned to the reservoir 113 for storage. As shown in the illustrated embodiment, the reservoir 113 is carried by or on the rotor 106. When the rotor 106 is part of an input of the viscous friction clutch 100, the reservoir 113 rotates whenever there is a torque input to the clutch 100. In some embodiments, the flux guide part 105 can adjoin the reservoir 113 and/or form at least a portion of a boundary of the reservoir 113. As shown in the illustrated embodiment, a reservoir plate 113a that defines part of a boundary of the reservoir 113 is optionally secured to the rear end 105a of the flux guide part 105. The reservoir plate 113 can be made of a ferromagnetic material and can optionally form a part of the flux path. In alternate embodiments, the reservoir 113 can optionally further include anti-drainback or anti-morning sickness features, such as one or more internal walls, a morning sickness prevention valve, or the like.

The housing 112 is a multi-piece assembly in the illustrated embodiment, and includes a base 112b and a cover 112c. In the illustrated embodiment, the housing 112 at least partially surrounds the rotor 106. The housing 112 (for example, the housing base 112b) is rotationally supported on the shaft 110 by bearings 112X, such that the housing 112 can rotate relative to the shaft 110 as well as relative to the rotor 106. The housing 112 can function as an output of the viscous friction clutch 100, and an output device such as a fan (not shown) can be attached to the housing 112 to accept a torque output selectively transmitted by the viscous friction clutch 100 during operation. The housing 112 can be made of a non-ferromagnetic material such as aluminum.

The working chamber 115 is located between the rotor 106 and the housing 112, such that a volume of the shear fluid present in the working chamber 115 can frictionally contact both the rotor 106 and the housing 112 to transmit torque between the rotor 106 and the housing 112 at a slip speed generally dependent upon the volume of the shear fluid present in the working chamber 115. The basic operation of working chambers in viscous friction clutches is known in the art.

The valve assembly 107 includes an armature 108 and a valve element 109. The armature 108 is connected to the valve element 109 and moves the valve element 109 in response to applied magnetic flux, as explained further below. In the illustrated embodiment, the valve assembly 107 is located at a front side of the rotor 106 while the electromagnetic coil 101 is located at an opposite rear side of the rotor 106. The valve element 109 can be spring biased to an open position by default, such that applied magnetic flux generates a valve actuation force that overcomes the spring biasing force and moves the armature 108 and the valve element 109 to a closed position. This is referred to as a "fail on" configuration, in that any loss of electrical power means that the spring biasing force moves the valve assembly 107 to an "on" or open position by default. As shown in the illustrated embodiment, the valve assembly 107, including the armature 108 and the valve element 109, is located within an interior of the viscous friction clutch 100 (that is, inside the housing 112) and is carried by or on the rotor 106. Moreover, in the illustrated embodiment, the valve element 109 pivots or translates in generally the axial direction during a stroke C (see FIG. 3). A stop 116 can optionally be provided on the rotor 106 to limit movement of the armature 108 and the valve element 109 as well as the stroke C in the off, open, or unattracted position of the valve assembly 107. The release orifice 114 allows the shear fluid to flow from the reservoir 113 to the working chamber 115, and can be selectively covered and uncovered by the valve assembly 107 to regulate the volume of the shear fluid present in the working chamber 115 and thereby control operation of the viscous friction clutch 100. The shear fluid is generally continuously pumped back to the reservoir 113 from the working chamber 115 through a return bore (not shown) during clutch operation.

During operation, the electromagnetic coil 101 can be selectively energized to generate magnetic flux that travels through the viscous friction clutch 100 along a magnetic flux path (or flux circuit) A to operate the valve assembly 107. FIG. 2 schematically illustrates the flux path A with dashed lines on one side of the axis of rotation $C_L$ of the clutch 100, though it should be understood that the flux path A has a three-dimensional shape that extends around the axis $C_L$ even though only a portion of the flux path A is annotated in FIG. 2. The flux path A allows the magnetic flux to pass from the electromagnetic coil 101 to the armature 108 of the valve assembly 107 and then back to the electromagnetic coil 101. The magnetic flux path A exits the coil 101 and enters the coil housing 102, then passes from the north pole 102N of the coil housing 102 across a gap to the shaft 110. The gap between the coil housing 102 and the shaft 110 is constant and is arranged radially in the illustrated embodiment. The magnetic flux can then travel across a gap between the shaft 110 and the armature 108 in an area of attraction D. The magnetic flux can optionally travel through the core 104c of the hub part 104 of the rotor insert assembly 103 in and/or near the area of attraction D in some embodiments. The area of attraction D can be in a location spaced radially outward from the axis of rotation $C_L$ in some embodiments, though in other embodiments the area of attraction D could reach the axis of rotation $C_L$. In the illustrated embodiment, the gap between the shaft 110 (as well as the core 104c) and the armature 108 in the area of attraction D is arranged axially. The size of the gap between the shaft 110 (as well as the core 104c) and the armature 108 changes during operation of the clutch 100, depending on movement of the armature 108. The distance of the gap between the armature 108 and the shaft 110 (as well as the core 104c) corresponds to the stroke C for the valve assembly 107 (see FIG. 3). In some embodiments, the magnetic flux can attract the armature 108 to the shaft 110 such that the gap between the armature 108 and the shaft 110 is entirely closed (that is, the armature 108 physically contacts the shaft 110 and/or the core 104c) while the electromagnetic coil 101 is energized. The flux path A continues from the armature 108 to the flux guide part 105 of the rotor insert assembly 103 across a gap F (see FIG. 3). The gap F is constant and is arranged radially (and is located at an outer diameter of the armature 108) in the illustrated embodiment. The constant radial gap F allows a constant magnetic flux flow independent from the opened or closed position of the armature 108. A constant magnetic flux flow in the flux path A helps improve the internal magnetic force to the armature 108. The flux path A then continues through the flux guide part 105 of the rotor insert assembly 103, passing axially through the entire rotor 106 between opposite front and rear sides. The flux path A then continues from the flux guide part 105 of the rotor insert assembly 103 to the south pole 102S of the coil housing 102 across a flux gap B (see FIG. 3), and then back to the electromagnetic coil 101.

As shown in the illustrated embodiment, the flux gap B is arranged axially and is a larger gap than the other gaps of the flux path A. The flux gap B can be constant in size. The flux gap B traverses a portion 112b-1 of the housing 112, as well as air gaps on axially opposite sides of the housing 112. More particularly, the flux gap B axially crosses a non-ferromagnetic portion 112b-1 of the base 112b of the housing 112 that lacks any embedded flux guide insert or other ferromagnetic components in or near the flux path A that passes entirely (or even partially) through the housing 112 between an interior and an exterior of the housing 112. Put another way, in some embodiments, there is no ferromagnetic material present in the flux gap B, which can therefore be called a non-ferromagnetic flux gap. The flux path A can pass across the flux gap B, through or across the portion 112b-1 of the housing 112 as well as one or more adjoining air gaps and any shear fluid present, without the need for any ferromagnetic flux guide that would potentially create an undesirable leak path for the shear fluid, particularly due to the different coefficients of thermal expansion of ferromagnetic material and adjoining non-ferromagnetic material (for instance, between steel and aluminum materials). In various embodiments, the number of air gaps within the flux gap B can be limited to no more than two air gaps, and the portion 112b-1 of the housing 112 can be the only non-ferromagnetic component that the flux path A crosses within the flux gap B. In some embodiments, a dimension of the flux gap B between the rear end 105a of the flux guide part 105 and the south pole 102S of the coil housing 102 can be smaller than a distance between the rear end 105a of the flux guide part 105 and any other nearby ferromagnetic materials; and, in still further embodiments, an axial dimension of the flux gap B between the rear end 105a of the flux guide part 105 and the coil housing 102 can be smaller than a distance in either an axial direction or the radially inward direction between the rear end 105a of the flux guide part 105 and any other nearby ferromagnetic materials. Moreover, because the flux guide part 105 extends through the rotor 106 and protrudes rearward in the illustrated embodiment, the dimension of the flux gap B between the rear end 105a of the flux guide part 105 and the south pole 102S of the coil housing 102 can be smaller than a distance between the rear side of the rotor 106 and the south pole 102S of the coil housing 102 along the flux path A. In some embodiments, an axial distance of the flux gap B between the rear end 105a of the flux guide part 105 and the south pole 102S of the coil housing 102 can be smaller than an axial distance between the south pole 102S of the coil housing 102 and the working chamber 115, which is to say that the rear end 105a of the flux guide part 105 can extend axially rearward of the working chamber 115. It should be noted that the presence of any ferromagnetic materials at the radially outward side of the flux path A would not tend to produce any short-circuit of the flux path A, and therefore in some embodiments ferromagnetic materials (for example, the reservoir plate 113a made of ferromagnetic material) can be present close to or in physical contact with the flux guide part 105 radially outward from the flux path A without significantly affecting performance of the flux path A at or near the flux gap B. Due to the relatively short and direct distance of the flux gap B (even though it may be larger than other gaps in the flux path A), there is no additional embedded ferrous insert required in the housing 112. The non-ferromagnetic portion 112b-1 of the housing 112 that is included in (and traversed by) the flux gap B is located radially outward from bearings 112X that rotationally support the housing 112 on the shaft 110 in the illustrated embodiment, such that the bearings 112X are located within an interior of the flux path A. Moreover, in the illustrated embodiment, the bearings 101X that support the electromagnetic coil 101 and the coil housing 102 on the shaft 110 are also located inside the flux path A.

In order to guide the magnetic flux path A from the shaft 110 into the armature 108 and then to the flux guide part 105 of the rotor insert assembly 103, it is important to avoid a magnetic shortcut between the flux guide part 105 and the shaft 110, which can be realized by using the rotor insert assembly 103 that has certain defined properties. In one embodiment, shown in isolation in FIGS. 4 and 5, this can be achieved by using a non-ferromagnetic material for the disk 104d of the hub part 104 of the rotor insert assembly 103. In this way, the flux guide part 105 and the core 104c, each made of ferromagnetic material, and the disk 104d, made of non-ferromagnetic material, can be separate pieces joined or connected together and embedded in or otherwise connected to the rotor 106, made of non-ferromagnetic material, such as using a die-casting process. Having the core 104c made of ferromagnetic material can help improve performance of the flux path A. Though in alternative embodiments, the core 104*c* and the disk 104*d* of the hub part 104 can be a single piece, made of non-magnetic material. The embodiment of the rotor insert assembly 103 shown in FIGS. 4 and 5 also includes interruptions 118*a*, 118*b*, and 118*c*, which can be configured as openings in the hub part 104 and/or the flux guide part 105. In the illustrated embodiment, a plurality of equally circumferentially spaced U-shaped interruptions 118*a* pass radially through the flux guide part 105 and extend all the way to a front end (opposite the rear end 105*a*) so as to be open in the axially forward direction, a plurality of U-shaped interruptions 118*b* are located at the outer diameter of the disk 104*d* of the hub part 104 and align with the interruptions 118*a* so as to create combined openings, with the interruptions 118*b* passing axially through the disk 104*d* and extending all the way to the outer diameter of the disk 104*d*, and, lastly, the interruptions 118*c* are a plurality of equally circumferentially spaced circular holes that pass axially through a middle of the disk 104*d*. Though in further embodiments other shapes and arrangements of the interruptions 118*a*, 118*b*, and/or 118*c* are possible. When fully installed in the viscous friction clutch 100, the interruptions 118*a*, 118*b*, and/or 118*c* can be at least partially filled with non-ferromagnetic material of the rotor 106. More particularly, in some embodiments, the interruptions 118*b* and 118*c* can each be completely filled with non-ferromagnetic material of the rotor 106 while the interruptions 118*a* can each by only partially filled with non-ferromagnetic material of the rotor 106.

Figure 6:
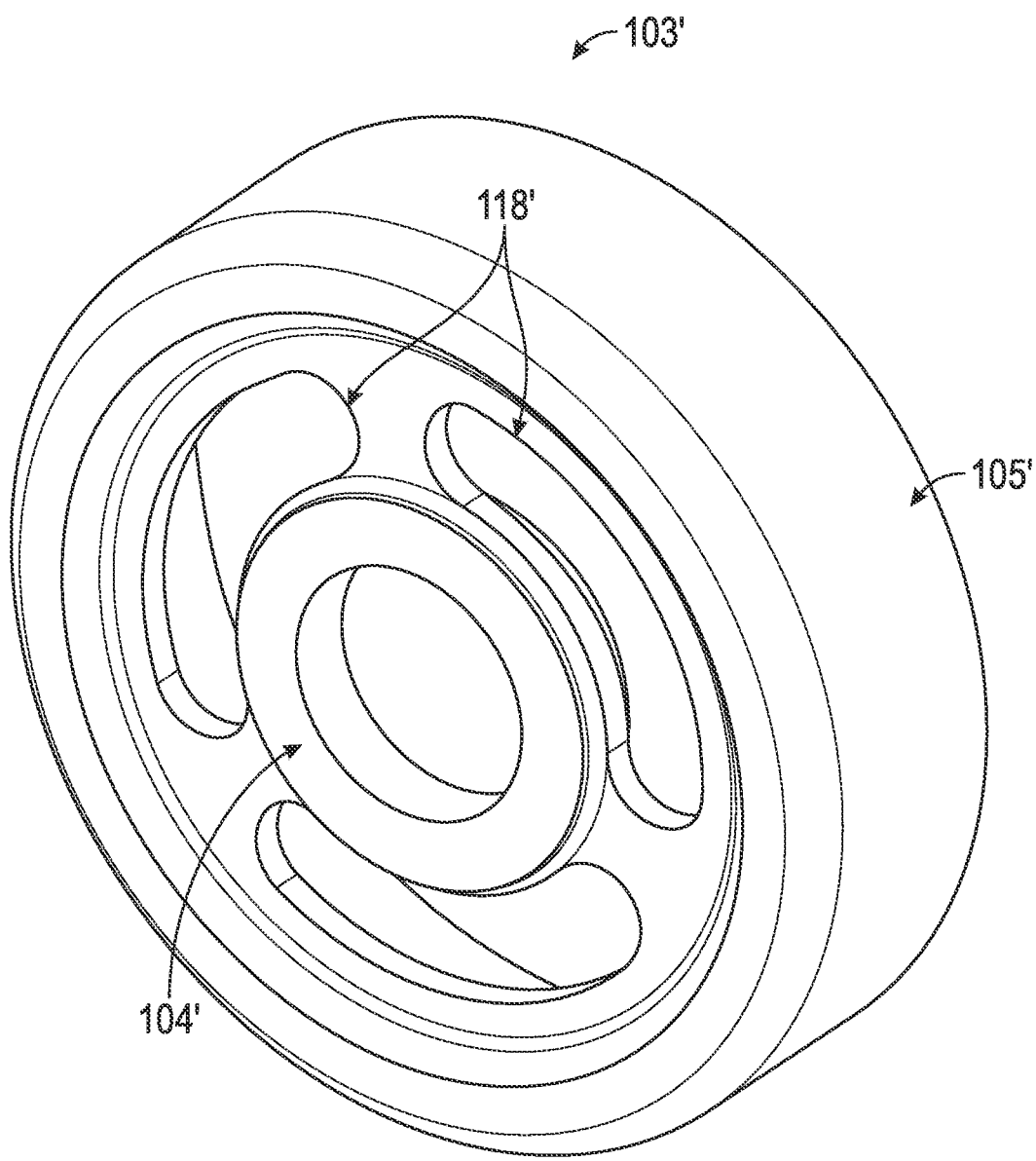
FIG. 6 is a perspective view of another embodiment of a rotor insert assembly, shown in isolation.

Alternatively, as shown in FIG. 6, a flux guide part 105' and a hub part 104' of a rotor insert assembly 103' can be made as a single unitary and monolithic piece made of a ferromagnetic material, and flux interrupting features, such as openings 118' located in the hub part 104' (and optionally also in the flux guide part 105' in further embodiments), can be present to reduce or avoid a magnetic shortcut between the flux guide part 105' and the hub part 104' (and the shaft 110) in generally the radial direction. Though in the illustrated embodiment the flux guide part 105' has an uninterrupted configuration, free of any openings or the like. The flux interrupting features (openings 118') are preferably as numerous and as large as possible. When fully installed in the viscous friction clutch 100, such openings 118' in the hub part 104' (and/or the flux guide part 105') are filled with non-ferromagnetic material of the rotor 106 for torque transmission between the rotor 106, the hub part 104', and the flux guide part 105'. The rotor insert assembly 103' otherwise is similar to and functions in essentially the same way as the rotor insert assembly 103 described above.

Figure 7:
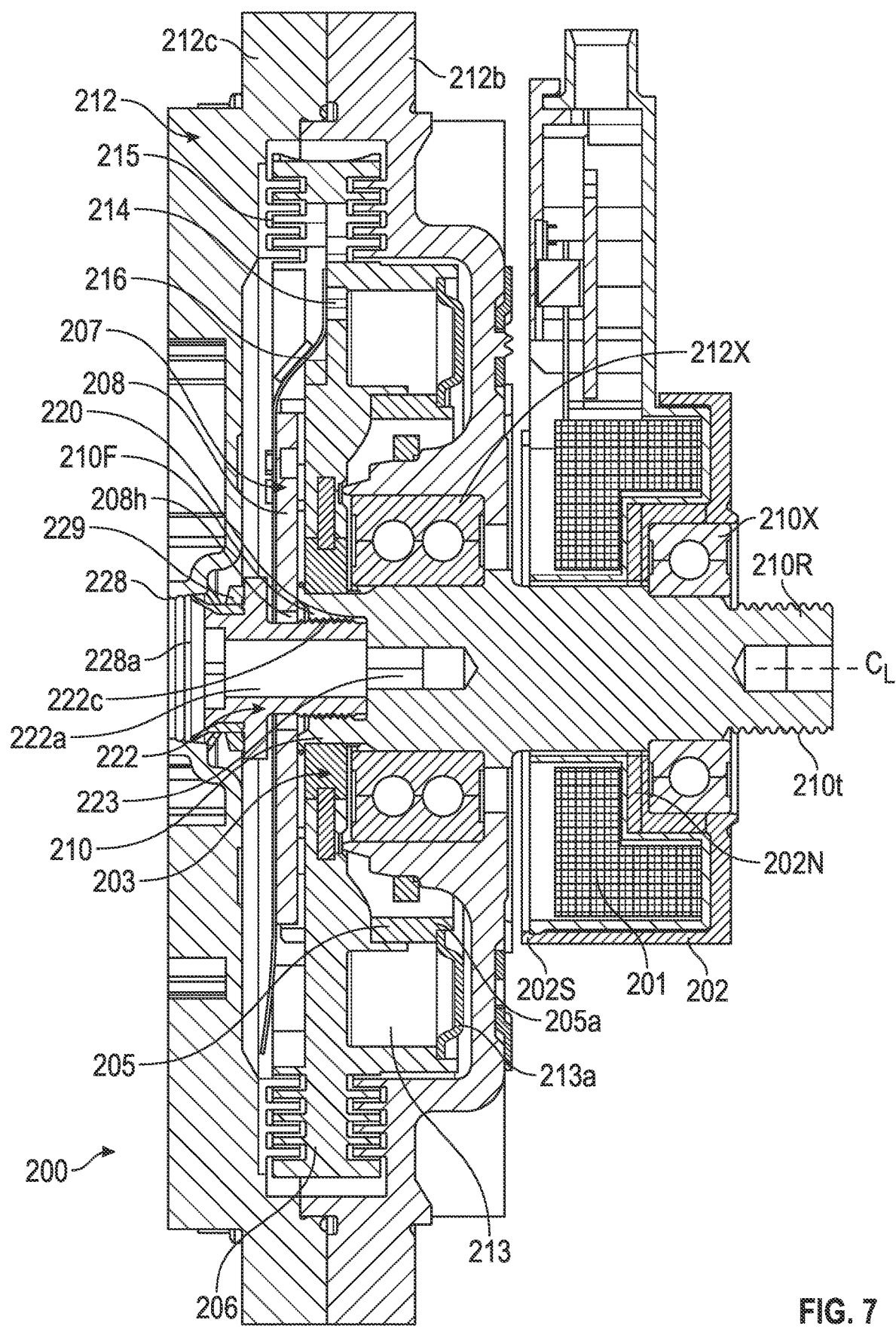
FIG. 7 is a cross-sectional view of another embodiment of a viscous friction clutch according to the present invention.
Figure 8:
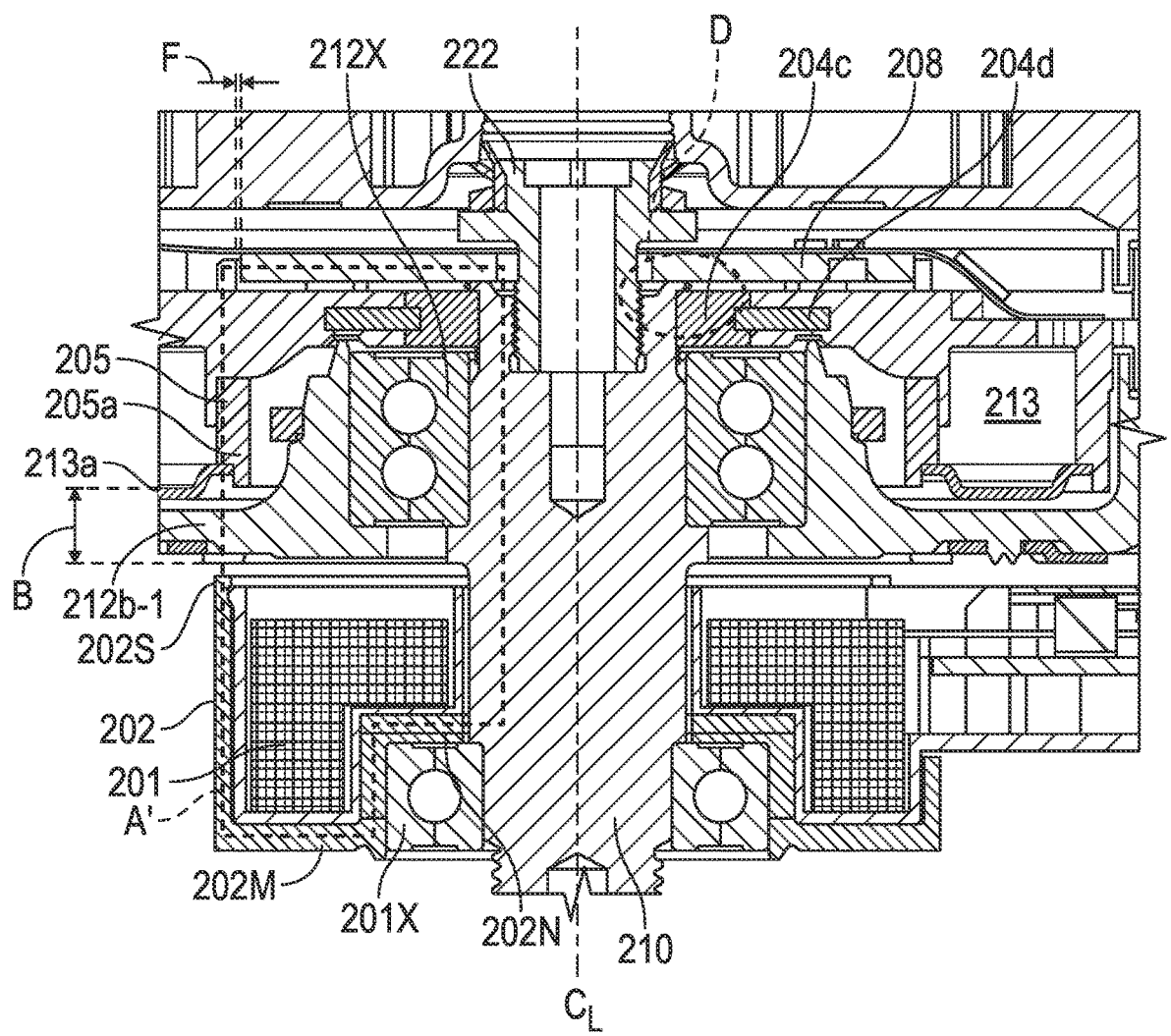
FIG. 8 is a partial cross-sectional view of the viscous friction clutch of FIG. 7 with schematic annotations to illustrate a magnetic flux path and area of magnetic attraction.
Figure 9:
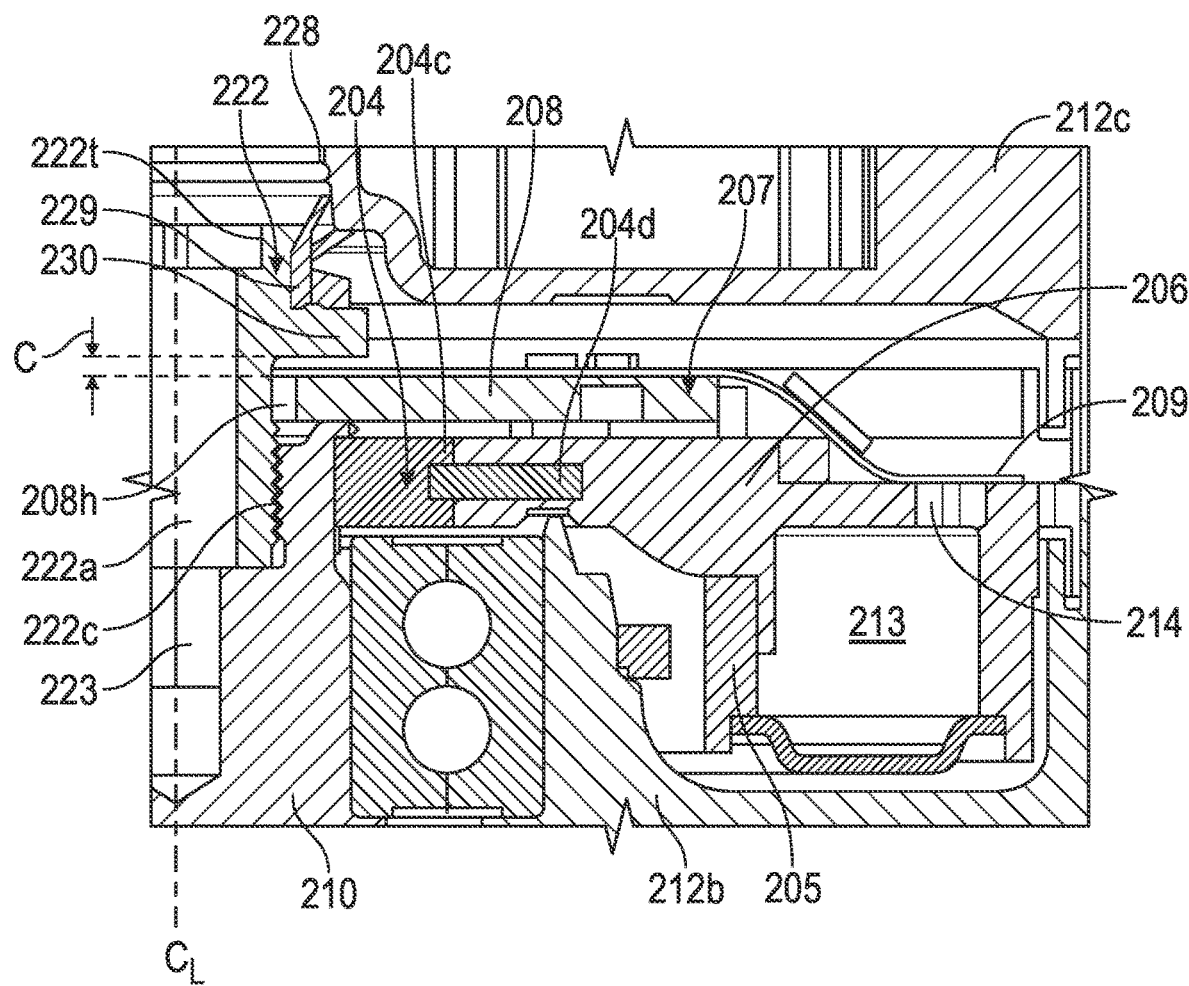
FIG. 9 is another partial cross-sectional view of a portion of the viscous friction clutch of FIGS. 7 and 8.

FIGS. 7-9 illustrate another embodiment of a viscous friction clutch 200. FIG. 7 is a cross-sectional view of this other embodiment of a viscous friction clutch 200; FIG. 8 is another cross-sectional view of the viscous friction clutch 200 with schematic annotations to illustrate a magnetic flux path A' and area of magnetic attraction D; and FIG. 9 is a partial cross-sectional view of a portion of the viscous friction clutch 200. In general, the embodiment of the viscous friction clutch 200 shown and described with respect to FIGS. 7-9 is similar to that of the embodiment of the viscous friction clutch 100 described above with respect to FIGS. 1-6, and therefore similar reference numbers generally increased by one hundred are used. More particularly, the viscous friction clutch 200 as shown in the embodiment of FIGS. 7-9 includes an electromagnetic coil 201, a coil housing 202 defining a north pole 202N and a south pole 202S, a rotor insert assembly 203 having a hub part 204 and a flux guide part 205, a rotor 206, a valve assembly 207 having an armature 208 and a valve element 209, a shaft 210, a housing 212 (including a base 212*b* and a cover 212*c*), a reservoir 213 (having a reservoir cover 213*a*), a release orifice 214, a working chamber 215, and an axis of rotation Cu Although not specifically shown, the viscous friction clutch 200 further includes a suitable return bore and pumping element. The magnetic flux path A', including flux gap B, a valve assembly stroke C, and an area of magnetic attraction D, can be similar or identical in the viscous friction clutch 200 as with the viscous friction clutch 100. However, the embodiment of the viscous friction clutch 200 of FIGS. 7-9 differs from the clutch 100 in the design around the shaft 210.

As shown in the illustrated embodiment of FIGS. 7-9, the front end of the shaft 210 includes a blind hole 220 and a carrier 222 engaged with the blind hole 220. The blind hole 220 can extend axially into the shaft 210, and can open axially forward, as shown in the illustrated embodiment. A rim of the shaft 210 surrounding the blind hole 220 at a front end 210F of the shaft 210 is sufficient to transmit magnetic flux from the shaft 220 to the armature 208 along the flux path A. The blind hole 220 in the shaft 210 provides the option for the usage of a torque or tooling feature 223 (for example, a tooling engagement feature such as a Torx® bit engagement feature) at the front end 210F of the shaft 210 (for instance, at a rear or bottom of the blind hole 220) to facilitate attaching a rear end 210R of the shaft 210 to a counter element (not shown) with another connection feature such as threads 210*t*. In the illustrated embodiment the front end 210F of the shaft 210 as well as the blind hole 220 are located in an interior portion of the viscous friction clutch 200, inside the housing 212. In order to provide access to the blind hole 220 and to the torque or tooling feature 223, an opening 228 (for example, a central hole) can be provided in the cover 212*c* of the housing 212. A corresponding center hole 208*h* can be provided in the armature 208 to allow access to the blind hole 220 and/or to the torque feature 223. A cap (not shown), which can be removable, can be provided at or within the opening 228 in the cover 212*c* of the housing 212 in order to protect elements within the viscous friction clutch 200 against debris and the like. The opening 228 or a nearby structure can include a suitable feature, such as an engagement groove, to allow engagement of the cap 228*a* to the cover 212*c* of the housing 212.

The carrier 222 can be engaged with the blind hole 220 with a connection feature 222*c* (for instance, threads), that attaches the carrier 222 to the shaft 210, and the connection feature 222*c* can be located within the blind hole 220. The carrier 222 can further include a tooling feature 222*t*, for instance, flats or a slot to accept a tool bit, driver, or other suitable tool that can apply torque. The carrier 222 can be made of a non-ferromagnetic material so as to isolate the carrier 222 from the flux path A, or at least to avoid interference with the flux path A. The carrier 222 can extend axially from the shaft 210 through the center hole 208*h* in the armature 208. The carrier 222 can further include an opening 222*a*, such as an axially-extending central opening that extends entirely through the carrier 222 between its opposite ends, to allow access to the torque or tooling feature 223, such as to allow insertion of a tool from a front side of the viscous friction clutch 200 through the opening 228 in the cover 212*c* of the housing 212 (and through the opening 208*h* in the armature 208). Further, the carrier 222 can support and carry a sealing element 229 (for example, a dynamic seal or a bearing such as a sealed bearing set), which contacts the housing 212 and can provide a seal against the cover 212*c* of the housing 212 at the opening 228 to help prevent shear fluid leakage. Additionally, a stop 230 can be provided on the carrier 222 at an opposite side of the armature 208 from the shaft 210. The stop 230 can limit the stroke C of the valve assembly 207, in particular, the stop 230 can limit the travel of the armature 208 and the valve element 209 in the axial direction under default spring biasing force. In the illustrated embodiment the stop 230 is a radially-outwardly-extending flange that extends from a main body of the carrier 222.

The rotor 206 can be rotationally fixed to the shaft 210, such that the rotor 206 and the shaft 210 co-rotate together at the same speed. The housing 212 (for example, the housing base 212b) can be rotationally supported on the shaft 210 by suitable bearings 212X, such that the housing 212 can rotate relative to the shaft 210 as well as relative to the rotor 206. The electromagnetic coil 201 and the coil housing 202 can be rotationally stationary and can both be mounted on the shaft 210 by suitable bearings 201X, with the electromagnetic coil 201 and the coil housing 202 located at an exterior of the housing 212.

The electromagnetic coil 201 can have an L-shape similar in section to that disclosed in PCT International App. Pub. No. WO2018/004833A1. Such an L-shaped electromagnetic coil 201 as shown in the illustrated embodiment can help reduce the overall size and mass of the viscous friction clutch 200. The electromagnetic coil 201 is positioned at least partially in the coil housing 202. The coil housing 202 can at least partially surround the electromagnetic coil 201 and can have a shape that conforms the L-shape of the electromagnetic coil 201. For instance, in the illustrated embodiment, the coil housing 202 has the south pole 202S located axially forward (with an end of the south pole 202S extending axially toward the base 212b of the housing 212 and the flux guide part 205), a middle portion 202M located axially rearward (and having a U- or C-shape), and the north pole 202N located axially forward of the middle portion 202M but axially rearward of the south pole 202S (with an end of the north pole 202N extending radially inward toward the shaft 210). The shapes of the middle portion 202M and the north pole 202N of the coil housing can provide a space for bearings.

The working chamber 215 is located between the rotor 206 and the housing 212, such that a volume of the shear fluid present in the working chamber 215 can frictionally contact both the rotor 206 and the housing 212 to transmit torque between the rotor 206 and the housing 212 at a slip speed generally dependent upon the volume of the shear fluid present in the working chamber 215. The rotor 206 and the shaft 210 can function as the input of the viscous friction clutch 200, while the housing 212 can function as the output. An output device, such as a fan (not shown), can be attached to the housing 212 to accept a torque output from the viscous friction clutch 200.

The valve assembly 207 operates in response to applied magnetic flux, in order to selectively cover and uncover the release orifice 214 to regulate a volume of shear fluid in the working chamber 215. The shear fluid can be stored in the reservoir 213 when not in use. In the illustrated embodiment, the valve assembly 207 is located at a front side of the rotor 206 while the electromagnetic coil 201 and the reservoir 213 are each located at an opposite rear side of the rotor 206.

In the illustrated embodiment, the rotor insert assembly 203 includes the hub part 204 at a radially inner location and the flux guide part 205 at a radially outer location (see also FIGS. 4 and 5). The hub part 204 can be located at a radially inner part of the rotor 206 and can provide a structural attachment between the rotor 206 and the shaft 210. In the illustrated embodiment, the hub part 204 is a multi-piece assembly that includes a core 204c and a disk 204d, with the disk 204d extending radially outward from the core 204c. The core 204c can be positioned directly on the shaft 210. The hub part 204 can include a non-ferromagnetic material such as austenitic stainless steel, and/or can be configured with magnetic flux-interrupting features that reduce or eliminate a magnetic short-circuit in a generally radial direction between the flux guide part 205 and the shaft 210, as was explained above with respect to a prior embodiment. In the illustrated embodiment, the core 204c is made of a ferromagnetic material and the disk 204d is made of a non-ferromagnetic material that interrupts any magnetic flux flow along the rotor insert assembly 203 in a radial direction. More generally, the hub part 204 of the rotor insert assembly 203 of the illustrated embodiment includes a non-ferromagnetic portion or at least a partially non-ferromagnetic portion between its inner diameter and its outer diameter.

The flux guide part 205 can be attached to the hub part 204 at a radially outer portion of the disk 204d. The flux guide part 205 extends axially through the rotor 206. The flux guide part 205 can be made of a ferromagnetic material in order to conduct magnetic flux through non-ferromagnetic material of the rotor 206. The flux guide part 205 in the illustrated embodiment includes a rear end 205a extending and protruding from a rear side of the rotor 206 in the axial direction, which helps guide magnetic flux to the south pole 202S of the coil housing 202, such as at or adjacent to an outer diameter of the coil housing 202, as explained further below. As shown in the illustrated embodiment, the rear end 205a of the flux guide part 205 is located at a radial position that overlaps with a radial position of the south pole 202S of the coil housing 202 (such that a flux path between them can be entirely axial), though in further embodiments other relative radial positions are possible.

During operation, the electromagnetic coil 201 can be selectively energized to generate magnetic flux that travels through the viscous friction clutch 200 along the magnetic flux path (or flux circuit) A to operate the valve assembly 207, similar to the operation of the viscous friction clutch 100 described above. FIG. 8 schematically illustrates the flux path A' with dashed lines on one side of the axis of rotation $C_L$ of the clutch 200, though it should be understood that the flux path A' has a three-dimensional shape that extends around the axis $C_L$ even though only a portion of the flux path A' is annotated in FIG. 8. The flux path A' allows the magnetic flux to pass from the electromagnetic coil 201 to the armature 208 of the valve assembly 207 and then back to the electromagnetic coil 201. The magnetic flux path A' exits the coil 201 and enters the coil housing 202, then passes from the north pole 202N of the coil housing 202 across a gap to the shaft 210. The gap between the coil housing 202 and the shaft 210 is constant and is arranged radially in the illustrated embodiment. The magnetic flux can then travel across a gap between the shaft 210 and the armature 208 in an area of attraction D. The magnetic flux can optionally travel through the core 204c of the hub part 204 of the rotor insert assembly 203 in and/or near the area of attraction D in some embodiments. The area of attraction D can be in a location spaced radially outward from the axis of rotation $C_L$ in some embodiments, though in other embodiments the area of attraction D could reach the axis of rotation $C_L$. In the illustrated embodiment, the gap between the shaft 210 (as well as the core 204c) and the armature 208 in the area of attraction D is arranged axially. The size of the gap between the shaft 210 (as well as the core 204c) and the armature 208 changes during operation of the clutch 200, depending on movement of the armature 208. The distance of the gap between the armature 208 and the shaft 210 (as well as the core 204c) corresponds to the stroke C for the valve assembly 207 (see FIG. 9). In some embodiments, the magnetic flux can attract the armature 208 to the shaft 210 such that the gap between the armature 208 and the shaft 210 is entirely closed (that is, the armature 208 physically contacts the shaft 210 and/or the core 204c) while the electromagnetic coil 201 is energized. The flux path A continues from the armature 208 to the flux guide part 205 of the rotor insert assembly 203 across a gap F, which is constant and is arranged radially (and is located at an outer diameter of the armature 208) in the illustrated embodiment. The constant radial gap F allows a constant magnetic flux flow independent from the opened or closed position of the armature 208. A constant magnetic flux flow in the flux path A' helps improve the internal magnetic force to the armature 208. The flux path A' then continues through the flux guide part 205 of the rotor insert assembly 203, passing axially through the entire rotor 206 between opposite front and rear sides. The flux path A' then continues from the flux guide part 205 of the rotor insert assembly 203 to the south pole 202S of the coil housing 202 across a flux gap B, and then back to the electromagnetic coil 201.

As shown in the illustrated embodiment, the flux gap B is arranged axially and is a larger gap than the other gaps of the flux path A'. The flux gap B can be constant in size. The flux gap B traverses a portion 212b-1 of the housing 212, as well as air gaps on axially opposite sides of the housing 212. More particularly, the flux gap B axially crosses a non-ferromagnetic portion 212b-1 of the base 212b of the housing 212 that lacks any embedded flux guide insert or other ferromagnetic components in or near the flux path A' that passes entirely (or even partially) through the housing 212 between an interior and an exterior of the housing 212, meaning that the flux gap B can be called a non-ferromagnetic flux gap. The flux path A' can pass across the flux gap B, through or across the portion 212b-1 of the housing 212 as well as one or more adjoining air gaps and any shear fluid present, without the need for any ferromagnetic flux guide that would potentially create an undesirable leak path for the shear fluid. In various embodiments, the number of air gaps within the flux gap B can be limited to no more than two air gaps, and the portion 212b-1 of the housing 212 can be the only non-ferromagnetic component that the flux path A' crosses within the flux gap B. In some embodiments, a dimension of the flux gap B between the rear end 205a of the flux guide part 205 and the south pole 202S of the coil housing 202 can be smaller than a distance between the rear end 205a of the flux guide part 205 and any other nearby ferromagnetic materials; and, in still further embodiments, an axial dimension of the flux gap B between the rear end 205a of the flux guide part 205 and the coil housing 102 can be smaller than a distance in either an axial direction or the radially inward direction between the rear end 205a of the flux guide part 205 and any other nearby ferromagnetic materials. Moreover, because the flux guide part 205 extends through the rotor 206 and protrudes rearward in the illustrated embodiment, the dimension of the flux gap B between the rear end 205a of the flux guide part 205 and the south pole 202S of the coil housing 202 can be smaller than a distance between the rear side of the rotor 206 and the south pole 202S of the coil housing 202 along the flux path A'. In some embodiments, an axial distance of the flux gap B between the rear end 205a of the flux guide part 205 and the south pole 202S of the coil housing 202 can be smaller than an axial distance between the south pole 202S of the coil housing 202 and the working chamber 215, which is to say that the rear end 205a of the flux guide part 205 can extend axially rearward of the working chamber 215. The non-ferromagnetic portion 212b-1 of the housing 212 that is included in (and traversed by) the flux gap B is located radially outward from bearings 212X that rotationally support the housing 212 on the shaft 210 in the illustrated embodiment, such that the bearings 212X are located within an interior of the flux path A'. Moreover, in the illustrated embodiment, the bearings 201X that support the electromagnetic coil 201 and the coil housing 202 on the shaft 210 are located outside the flux path A'.

It should be noted that in various embodiments either of the rotor insert assemblies 103 and 103' discussed above and shown in FIGS. 4-6 can be utilized with the viscous friction clutch 200, as desired for particular applications. Moreover, other embodiments of rotor insert assemblies are possible in further embodiments.

In view of the entirety of the present disclosure, including the accompanying figures, persons of ordinary skill in the art will recognize that embodiments of the disclosed viscous friction clutch provide numerous advantages and benefits. For instance, disclosed embodiments provide a electromagnetically-controlled viscous friction clutch that can be relatively compact with a relatively low mass, as well as relatively simple manufacture, that lacks any magnetic flux guide through a housing that would potentially create a shear fluid leak path while still transmitting magnetic flux across and through a non-ferromagnetic portion of the housing. For example, a rotor insert assembly that comprises a non-ferromagnetic or at least partially non-ferromagnetic portion between its inner diameter and its outer diameter can be utilized in order to reduce or minimize a magnetic shortcut or short-circuit of an electromagnetic flux path through the viscous friction clutch and to help increase magnetic power available to move an armature of a valve assembly, even without having any embedded flux insert in the housing whatsoever. It has been noted that some known clutch designs have a flux path that does not pass through a housing but instead the flux path is either entirely contained within an interior of the housing or else the flux path follows multiple isolated pathways in a shaft, rotor hub, and/or bearing assembly located radially inward from the housing (that is, the flux path does not pass through any part of the housing but rather avoids the housing). But flux paths contained entirely inside a housing are generally associated with stationary (that is, non-rotating) journal bracket shafts, whereas presently disclosed embodiments provide for a "live" or driven shaft. And having multiple magnetically isolated pathways in a shaft, rotor hub, and/or bearing assembly tends to increase the overall radial size of the clutch and can also make fabrication more complex, whereas presently disclosed embodiments allow for the use of a shaft that can be a single monolithic piece without any embedded inserts or embedded magnetic isolating inserts. Additionally, the lack of any flux guides in certain prior art clutches means that magnetic flux is transmitted without and/or through or across various clutch components in an inefficient manner, which results in a need for a relatively large electromagnetic coil to generate enough flux to overcome such inefficiencies. For instance, such prior art clutches may require magnetic flux to cross a single flux gap that includes three or more air gaps and multiple, separate non-ferromagnetic components, whereas presently disclosed embodiments can limit the number of air gaps in a flux gap that crosses a non-ferromagnetic portion of the housing. Moreover, such persons of ordinary skill in the art will recognize that the present disclosure includes methods of making and using the disclosed viscous friction clutch.

Discussion of Possible Embodiments

A viscous friction clutch can include: a rotor; a housing, with the housing being rotatable relative to the rotor; a working chamber located between the rotor and the housing such that a volume of shear fluid can be selectively introduced to the working chamber to contact both the rotor and the housing; an electromagnetic coil; a valve assembly that controls the volume of the shear fluid present in the working chamber; a flux path that magnetically links the electromagnetic coil and the valve assembly, the flux path passing through a flux guide part made of a ferromagnetic material that extends through the rotor in an interior of the viscous friction clutch and across a flux gap that traverses both an air gap and a non-ferromagnetic portion of the housing.

The viscous friction clutch of the preceding paragraph can optionally include, additionally and/or alternatively, any one or more of the following features, configurations and/or additional components:

the flux guide part can be embedded in the rotor;
the rotor can be made of non-ferromagnetic material, such as aluminum;
the flux guide part can be part of a multi-piece rotor insert assembly that further includes a hub part at least partially made of a non-ferromagnetic material;
a rotor insert assembly can include the flux guide part and an at least partially non-ferromagnetic hub part between an inner diameter and an outer diameter, and the flux guide part can be located at or near the outer diameter;
the hub part can include a core made of a ferromagnetic material and a disk made of a non-ferromagnetic material that extends radially outward from the core;
a portion of the flux guide part can protrude axially from the rotor at a location adjacent to an outer diameter of an electromagnetic coil housing separated by the flux gap, with the electromagnetic coil located at least partially within the electromagnetic coil housing;
a rear end of the flux guide part can extend axially rearward of the working chamber;
the electromagnetic coil can be located at least partially within an electromagnetic coil housing, and a rear end of the flux guide part can protrude axially from a rear side of the rotor such that the flux gap between the rear end of the flux guide part and the coil housing is smaller than a distance between the rear side of the rotor and the coil housing along the flux path;
the housing can lack any embedded ferromagnetic flux guiding insert in (or near) the flux path that passes between an interior and an exterior of the housing;
the flux path can include a radial gap between an armature of the valve assembly and the flux guide part, and that radial gap can be located at an outer diameter of the armature;
a shaft rotationally fixed to the rotor;
an end of the shaft within an interior of the viscous friction clutch can include a blind hole that extends axially;
a carrier attached to the shaft at the blind hole;
the carrier can be made of a non-ferromagnetic material;
a sealing element (for instance, a dynamic seal or sealed bearing) carried by the carrier that contacts the housing;
the carrier can include an axially-extending central opening that extends entirely through the carrier;
the carrier can further include a tooling feature;
the carrier can further include a stop arranged to contact an armature of the valve assembly during a stroke of the valve assembly;
the shaft can include a tooling feature located in the blind hole;
a cover of the housing can include an opening to allow access to the shaft and the tooling feature with a tool (for example, a wrench, bit, screwdriver, or the like);
a cap can further be provided at or within the opening in the cover of the housing;
the electromagnetic coil can be positioned at least partially in a coil housing that has opposite magnetic poles and a middle portion in between the poles;
one of the magnetic poles can extend radially and the other magnetic pole can extend axially;
the middle portion of the coil housing can be U-shaped;
the flux guide part extends axially through the entire rotor between opposite front and rear sides of the rotor;
a reservoir carried by the rotor;
the rotor can act as an input to the viscous friction clutch, and the rotor and the reservoir both rotate at an input speed whenever there is a torque input to the viscous friction clutch;
a shaft that is rotationally fixed to the rotor; and/or
bearings rotationally supporting the housing on the shaft, with the bearings located within an interior of the flux path.

A method of transmitting magnetic flux through a viscous friction clutch to operate a valve assembly, the viscous friction clutch including a rotor and a housing that are each rotatable and also a shaft that is rotationally fixed to the rotor, wherein the valve assembly controls a volume of shear fluid present in a working chamber in order to selectively control a degree of viscous frictional engagement between the rotor and the housing; the method can include energizing an electromagnetic coil located at an exterior of the housing of the viscous friction clutch, with the electromagnetic coil being rotationally stationary; transmitting magnetic flux from the electromagnetic coil to a coil housing that at least partially surrounds the electromagnetic coil; transmitting magnetic flux from the coil housing to the shaft of the viscous friction clutch across a radial gap; transmitting magnetic flux from the shaft to an armature of the valve assembly across an axial gap in an area of magnetic attraction; transmitting magnetic flux from the armature to a flux guide part across a gap, with the flux guide part being made of a ferromagnetic material; transmitting magnetic flux along the flux guide part between axially opposite front and rear sides of the rotor of the viscous friction clutch; transmitting magnetic flux from the flux guide part to the coil housing across a flux gap that includes a non-ferromagnetic portion of the housing of the viscous friction clutch; and transmitting magnetic flux from the coil housing back to the electromagnetic coil.

The method of the preceding paragraph can optionally include, additionally and/or alternatively, any one or more of the following features, configurations and/or additional steps:

transmitting magnetic flux through a core of a hub part embedded in the rotor;
the gap between the armature and the flux guide part can be arranged radially and can be constant;
the radial gap between the coil housing and the shaft can be constant;
the flux gap between the flux guide part and the coil housing can be arranged axially and can traverse two air gaps at axially opposite sides of the non-ferromagnetic portion of the housing of the viscous friction clutch;
the flux gap between the flux guide part and the coil housing can be constant;
the flux gap between the flux guide part and the coil housing can be the largest gap in a flux path that magnetically links the electromagnetic coil and the armature of the valve assembly;
the non-ferromagnetic portion of the housing that is included in the flux gap can be located radially outward from bearings that rotationally support the housing on the shaft; and/or
a dimension of the flux gap between a rear end of the flux guide part and the coil housing is smaller than a distance between the rear side of the rotor and the coil housing along the flux path.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory electromagnetic field fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For example, although it has been disclosed that a flux conducting ferromagnetic housing insert is not necessary for electromagnetic control of the viscous friction clutch, it is contemplated that alternate embodiments could still include such a ferromagnetic housing insert, whether as part of an electromagnetic control system or for one or more other purposes. Moreover, in further embodiments, a valve assembly could be positioned at a rear side of the rotor or attached to a housing. Additionally, in still further embodiments, a valve assembly using control rods or the like could be utilized with the present invention, such as a valve assembly having one or more control rods positioned entirely within an interior of the viscous friction clutch and passing through a rotor disk, for instance. Further, the locations of north and south magnetic poles of a coil housing can be reversed or swapped as desired in various embodiments.

The invention claimed is:

1. A viscous friction clutch comprising:
a rotor;
a housing, wherein the housing is rotatable relative to the rotor;
a working chamber located between the rotor and the housing such that a volume of shear fluid can be selectively introduced to the working chamber to contact both the rotor and the housing;
an electromagnetic coil;
a valve assembly that controls the volume of the shear fluid present in the working chamber; and
a flux path that magnetically links the electromagnetic coil and the valve assembly, the flux path passing through a flux guide part made of a ferromagnetic material that extends through the rotor in an interior of the viscous friction clutch and across a flux gap that traverses both an air gap and a non-ferromagnetic portion of the housing.

2. The viscous friction clutch of claim 1, wherein the flux guide part is embedded in the rotor, and wherein the rotor is made of non-ferromagnetic material.

3. The viscous friction clutch of claim 1, wherein the flux guide part is part of a multi-piece rotor insert assembly that further includes a hub part at least partially made of a non-ferromagnetic material.

4. The viscous friction clutch of claim 1, wherein a rotor insert assembly includes the flux guide part and an at least partially non-ferromagnetic hub part between an inner diameter and an outer diameter, and wherein the flux guide part is located at or near the outer diameter.

5. The viscous friction clutch of claim 4, wherein the hub part includes a core made of a ferromagnetic material and a disk made of a non-ferromagnetic material that extends radially outward from the core.

6. The viscous friction clutch of claim 1, wherein a portion of the flux guide part protrudes axially from the rotor at a location adjacent to an outer diameter of an electromagnetic coil housing separated by the flux gap, and wherein the electromagnetic coil is located at least partially within the electromagnetic coil housing.

7. The viscous friction clutch of claim 1, wherein a rear end of the flux guide part extends axially rearward of the working chamber.

8. The viscous friction clutch of claim 1, wherein the housing lacks any embedded ferromagnetic flux guiding insert in the flux path that passes between an interior and an exterior of the housing.

9. The viscous friction clutch of claim 1, wherein the flux path includes a radial gap between an armature of the valve assembly and the flux guide part, and wherein the radial gap is located at an outer diameter of the armature.

10. The viscous friction clutch of claim 1 and further comprising:
a shaft, wherein the shaft is rotationally fixed to the rotor, and wherein an end of the shaft within an interior of the viscous friction clutch includes a blind hole that extends axially.

11. The viscous friction clutch of claim 10 and further comprising:
a carrier attached to the shaft at the blind hole, wherein the carrier is made of a non-ferromagnetic material; and
a sealing element carried by the carrier, wherein the sealing element contacts the housing.

12. The viscous friction clutch of claim 11, wherein the carrier includes an axially-extending central opening that extends entirely through the carrier.

13. The viscous friction clutch of claim 11, wherein the carrier includes a stop arranged to contact an armature of the valve assembly during a stroke of the valve assembly.

14. The viscous friction clutch of claim 11, wherein the shaft includes a tooling feature located in the blind hole.

15. The viscous friction clutch of claim 14, wherein a cover of the housing includes an opening to allow access to the shaft and the tooling feature with a tool.

16. The viscous friction clutch of claim 1 and further comprising:
a coil housing, wherein the electromagnetic coil is positioned at least partially in the coil housing, and wherein the coil housing has opposite magnetic poles and a middle portion in between the poles, wherein one of the magnetic poles extends radially and the other magnetic pole extends axially.

17. The viscous friction clutch of claim 16, wherein the middle portion of the coil housing is U-shaped.

18. The viscous friction clutch of claim 1, wherein the ferromagnetic flux guide part extends axially through the entire rotor between opposite front and rear sides of the rotor.

19. The viscous friction clutch of claim 1 and further comprising:
a reservoir carried by the rotor, wherein the rotor acts as an input to the viscous friction clutch, and wherein the rotor and the reservoir both rotate at an input speed whenever there is a torque input to the viscous friction clutch.

20. The viscous friction clutch of claim 1 and further comprising:
a shaft, wherein the shaft is rotationally fixed to the rotor; and
bearings rotationally supporting the housing on the shaft, wherein the bearings are located within an interior of the flux path.

21. A method of transmitting magnetic flux through a viscous friction clutch to operate a valve assembly, the viscous friction clutch including a rotor and a housing that are each rotatable and also a shaft that is rotationally fixed to the rotor, wherein the valve assembly controls a volume of shear fluid present in a working chamber in order to selectively control a degree of viscous frictional engagement between the rotor and the housing, the method comprising:
energizing an electromagnetic coil located at an exterior of the housing of the viscous friction clutch, wherein the electromagnetic coil is rotationally stationary;
transmitting magnetic flux from the electromagnetic coil to a coil housing that at least partially surrounds the electromagnetic coil;
transmitting magnetic flux from the coil housing to the shaft of the viscous friction clutch across a radial gap;
transmitting magnetic flux from the shaft to an armature of the valve assembly across an axial gap in an area of magnetic attraction;
transmitting magnetic flux from the armature to a flux guide part across a gap, wherein the flux guide part is made of a ferromagnetic material;
transmitting magnetic flux along the flux guide part between axially opposite front and rear sides of the rotor of the viscous friction clutch;
transmitting magnetic flux from the flux guide part to the coil housing across a flux gap that includes a non-ferromagnetic portion of the housing of the viscous friction clutch; and
transmitting magnetic flux from the coil housing back to the electromagnetic coil.

22. The method of claim 21 and further comprising:
transmitting magnetic flux through a core of a hub part embedded in the rotor.

23. The method of claim 21, wherein the gap between the armature and the flux guide part is arranged radially and is constant.

24. The method of claim 21, wherein the radial gap between the coil housing and the shaft is constant.

25. The method of claim 21, wherein the flux gap between the flux guide part and the coil housing is arranged axially and traverses two air gaps at axially opposite sides of the non-ferromagnetic portion of the housing of the viscous friction clutch.

26. The method of claim 21, wherein the flux gap between the flux guide part and the coil housing is constant.

27. The method of claim 21, wherein the flux gap between the flux guide part and the coil housing is the largest gap in a flux path that magnetically links the electromagnetic coil and the armature of the valve assembly.

28. The method of claim 21, wherein the non-ferromagnetic portion of the housing that is included in the flux gap is located radially outward from bearings that rotationally support the housing on the shaft.

29. The method of claim 21, wherein a dimension of the flux gap between a rear end of the flux guide part and the coil housing is smaller than a distance between the rear side of the rotor and the coil housing along a flux path that magnetically links the electromagnetic coil and the armature of the valve assembly.

* * * * *